(12) United States Patent
Talwar

(10) Patent No.: US 7,012,978 B2
(45) Date of Patent: Mar. 14, 2006

(54) ROBUST MULTIPLE CHAIN RECEIVER

(75) Inventor: Shilpa Talwar, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 863 days.

(21) Appl. No.: 10/107,237

(22) Filed: Mar. 26, 2002

(65) Prior Publication Data

US 2003/0185285 A1 Oct. 2, 2003

(51) Int. Cl.
*H03D 1/04* (2006.01)
*H04L 1/02* (2006.01)

(52) U.S. Cl. .................................. 375/346; 375/347

(58) Field of Classification Search ................ 375/267, 375/347, 316, 343, 340, 130, 140, 144, 147, 375/148, 285, 346; 455/132–135
See application file for complete search history.

(56) References Cited

U.S. PATENT DOCUMENTS

| | | | |
|---|---|---|---|
| 5,819,168 A | 10/1998 | Golden et al. | |
| 5,886,988 A | 3/1999 | Yun et al. | |
| 6,507,605 B1 * | 1/2003 | Fukumoto et al. | 375/152 |
| 6,757,241 B1 * | 6/2004 | Jones et al. | 370/208 |
| 6,888,809 B1 * | 5/2005 | Foschini et al. | 370/334 |
| 2001/0028677 A1 * | 10/2001 | Wang et al. | 375/148 |

FOREIGN PATENT DOCUMENTS

| | | |
|---|---|---|
| EP | 1 185 001 A2 | 3/2002 |
| WO | WO 96/22662 | 7/1996 |

\* cited by examiner

*Primary Examiner*—Tesfaldet Bocure
(74) *Attorney, Agent, or Firm*—Michael A. Proksch

(57) ABSTRACT

The present invention provides a method and system for receiving a plurality of transmission signals at a receiver, the transmission signals each traveling through a corresponding transmission channel. The receiver includes a plurality of receiver channels, a receiver channel corresponding to each transmission channel. Each receiver channel receives a corresponding transmission signal. The received transmission signals are detected to determine whether the received transmission signals are dominated by noise or interference. If the received transmission signals are dominated by noise, then a first set of weights are selected as a receiver weighting. If the received transmission signals are dominated by interference, then a second set of weights are selected as the receiver weighting. The received transmission signals are estimated based upon the receiver weighting. Detecting whether the received transmission signals are dominated by noise or interference includes determining a level of correlation between the received transmission signals. Detecting whether the received transmission signals are dominated by noise or interference can be determined during a time slot of nulled transmission signals. If the transmission signals are multiple carrier signals, then detecting whether the received transmission signals are dominated by noise or interference can be determined during a frequency and time slot of a nulled carrier of the transmission signals. The first set of weights can be based upon a first covariance matrix, wherein the first covariance matrix represents received noise and interference covariance. The second set of weights can be based upon the second covariance matrix, wherein the second covariance matrix represents interference covariance. The first set of weights and the second set of weights can also be used for transmission mode selection and receiver soft decoding.

26 Claims, 6 Drawing Sheets

ROBUST MULTIPLE CHAIN RECEIVER

FIELD OF THE INVENTION

The invention relates generally to a wireless receiver. More particularly, the invention relates to a system and method for an adaptive multiple-chain receiver that includes weighting.

BACKGROUND OF THE INVENTION

Wireless communication systems commonly include information-carrying modulated carrier signals that are wirelessly transmitted from a transmission source (for example, a base transceiver station) to one or more receivers (for example, subscriber units) within an area or region.

A form of wireless communication includes multiple transmit antennae and/or multiple receiver antennae. Multiple antennae communication systems can support communication diversity and spatial multiplexing.

A Wireless Channel

FIG. 1 shows modulated carrier signals traveling from a transmitter 110 to a receiver 120 following many different (multiple) transmission paths.

Multipath can include a composition of a primary signal plus duplicate or echoed images caused by reflections of signals off objects between the transmitter and receiver. The receiver may receive the primary signal sent by the transmitter, but also receives secondary signals that are reflected off objects located in the signal path. The reflected signals arrive at the receiver later than the primary signal. Due to this misalignment, the multipath signals can cause intersymbol interference or distortion of the received signal.

The actual received signal can include a combination of a primary and several reflected signals. Because the distance traveled by the original signal is shorter than the reflected signals, the signals are received at different times. The time difference between the first received and the last received signal is called the delay spread and can be as great as several micro-seconds.

The multiple paths traveled by the modulated carrier signal typically results in fading of the modulated carrier signal. The fading can be time selective and cause the amplitude and phase of the modulated signal to vary with time. The fading can also be frequency selective and cause the frequency response of the channel over the signal bandwidth to vary with frequency.

Spatial Multiplexing

Spatial multiplexing is a transmission technology that exploits multiple antennae at both the base transceiver station and at the subscriber units to increase the bit rate in a wireless radio link with no additional power or bandwidth consumption. Under certain conditions, spatial multiplexing offers a linear increase in spectrum efficiency with the number of antennae. For example, if three antennae are used at the transmitter (base transceiver station) and the receiver (subscriber unit), the stream of possibly coded information symbols is split into three independent substreams. These substreams occupy the same channel of a multiple access protocol. Possible same channel multiple access protocols include a same time slot in a time-division multiple access protocol, a same frequency slot in frequency-division multiple access protocol, a same code sequence in code-division multiple access protocol or a same spatial target location in space-division multiple access protocol. The substreams are applied separately to the transmit antennae and transmitted through a radio channel. Due to the presence of various scattering objects in the environment, each signal experiences multipath propagation.

The composite signals resulting from the transmission are finally captured by an array of receiving antennae with random phase and amplitudes. At the receiver array, a spatial signature of each of the received signals is estimated. Based on the spatial signatures, a signal processing technique is applied to separate the signals, recovering the original substreams.

FIG. 2 shows three transmitter antenna arrays 210, 220, 230 that transmit data symbols to a receiver antenna array 240. Each transmitter antenna array and each receiver antenna array include spatially separate antennae. A receiver connected to the receiver antenna array 240 separates the received signals.

Communication Diversity

Antenna diversity is a technique used in multiple antenna-based communication system to reduce the effects of multipath fading. Antenna diversity can be obtained by providing a transmitter and/or a receiver with two or more antennae. Each transmit and receive antenna pair include a transmission channel. The transmission channels fade in a statistically independent manner. Therefore, when one transmission channel is fading due to the destructive effects of multi-path interference, another of the transmission channels is unlikely to be suffering from fading simultaneously. By virtue of the redundancy provided by these independent transmission channels, a receiver can often reduce the detrimental effects of fading.

Multiple channel receivers are generally associated with spatial multiplexing, receiver diversity or interference cancelling. Each of the channel receivers generally includes weighting that is used to estimate a received data streams from the received information signals. Typically, the received information signal includes noise and interference that limits the accuracy of the estimated received data streams. The noise typically consists of a noise floor due to thermal effects and background noise. The interference is generally due to other transmitters transmitting within a common frequency band. The interfering transmitters can belong to the same communication system and interfere due to cellular frequency reuse, or the transmitters can belong to other communication systems that are located in nearby regions.

It is desirable to have a method and system for receiving multiple information signals at a common receiver. It is desirable that the receiver be adaptable to optimally receiving information signals that are dominated by interference or noise. The method and system should be easily implemented with existing multiple channel weighted receivers.

SUMMARY OF THE INVENTION

The invention includes a method and system for receiving multiple signals at a multiple channel receiver. The receiver is adaptable to optimally receive information signals that are dominated by either noise or interference. The method and system of the invention are easily implemented with existing multiple channel weighted receivers.

A first embodiment of the invention includes a method for receiving a plurality of transmission signals at a receiver. The transmission signals each travel through a corresponding transmission channel. The receiver includes a plurality of receiver channels, a receiver channel corresponding to each transmission channel. The method includes each receiver channel receiving a corresponding transmission signal. The method further includes detecting whether the received transmission signals are dominated by noise or interference. A first set of weights are selected as a receiver weighting if the received transmission signals are dominated by noise. A second set of weights are selected as the receiver weighting if the received transmission signals are dominated by interference. The received transmission signals are estimated based upon the selected receiver weighting.

Detecting whether the received transmission signals are dominated by noise or interference can include determining a level of spatial correlation between the received transmission signals. Detecting whether the received transmission signals are dominated by noise or interference can be determined during at least one time slot of nulled transmission signals. Detecting whether the received transmission signals are dominated by noise or interference can be determined during at least one time slot of a nulled carrier of multiple carrier transmission signals. Detecting whether the received transmission signals are dominated by noise or interference can be repeated periodically. Detecting whether the received transmission signals are dominated by noise or interference can be repeated as determined by interference monitoring knowledge.

A second embodiment is similar to the first embodiment. The second embodiment further includes generating a first covariance matrix representing received noise and interference covariance, and generating a second covariance matrix representing interference covariance. The first set of weights can be based upon the first covariance matrix, and the second set of weights can be based upon the second covariance matrix.

The first covariance matrix can be calculated by averaging an outer product of received nulled single carrier signals over at least one transmission time slot.

The second covariance matrix can be calculated by windowing and averaging an outer product of null tones of received single carrier signals over at least one transmission time slot.

The first covariance matrix can be calculated by averaging an outer product of received multiple carrier signals at null carriers of at least one transmission time slot.

The second covariance matrix can be calculated by windowing and averaging an outer product of neighboring null tones of a received multiple carrier signal of at least one time slot.

The selected sets of weights can be additionally used for soft decoding of the received transmission signals, or can be used for transmission mode selection.

Detecting whether the received transmission signals are dominated by noise or interference can include calculating a ratio of mean-squares values of diagonal elements of the first covariance matrix to mean-squares values of off-diagonal elements of the first covariance matrix.

An embodiment includes the first set of weights being calculated consistent with an maximum ratio combination (MRC) weighting if only one information signal is transmitted. The first set of weights are calculated consistent with a minimum mean squared estimate (MMSE) weighting if more than one information signal is transmitted.

Another embodiment includes the second set of weights being calculated consistent with a minimum mean squared estimate (MMSE) weighting if one or more information signals are transmitted.

A third embodiment includes a multiple channel receiver for receiving a plurality of transmission signals. The transmission signals each traveling through a corresponding transmission channel. A receiver channel corresponds with each transmission channel. The receiver includes a means for detecting whether the received transmission signals are dominated by one of noise and interference. A first set of weights are selected as a receiver weighting if the received transmission signals are dominated by noise. A second set of weights are selected as the receiver weighting if the received transmission signals are dominated by interference. The received transmission signals are estimated based upon the selected receiver weighting.

Other aspects and advantages of the present invention will become apparent from the following detailed description, taken in conjunction with the accompanying drawings, illustrating by way of example the principles of the invention.

DETAILED DESCRIPTION

Figure 1:
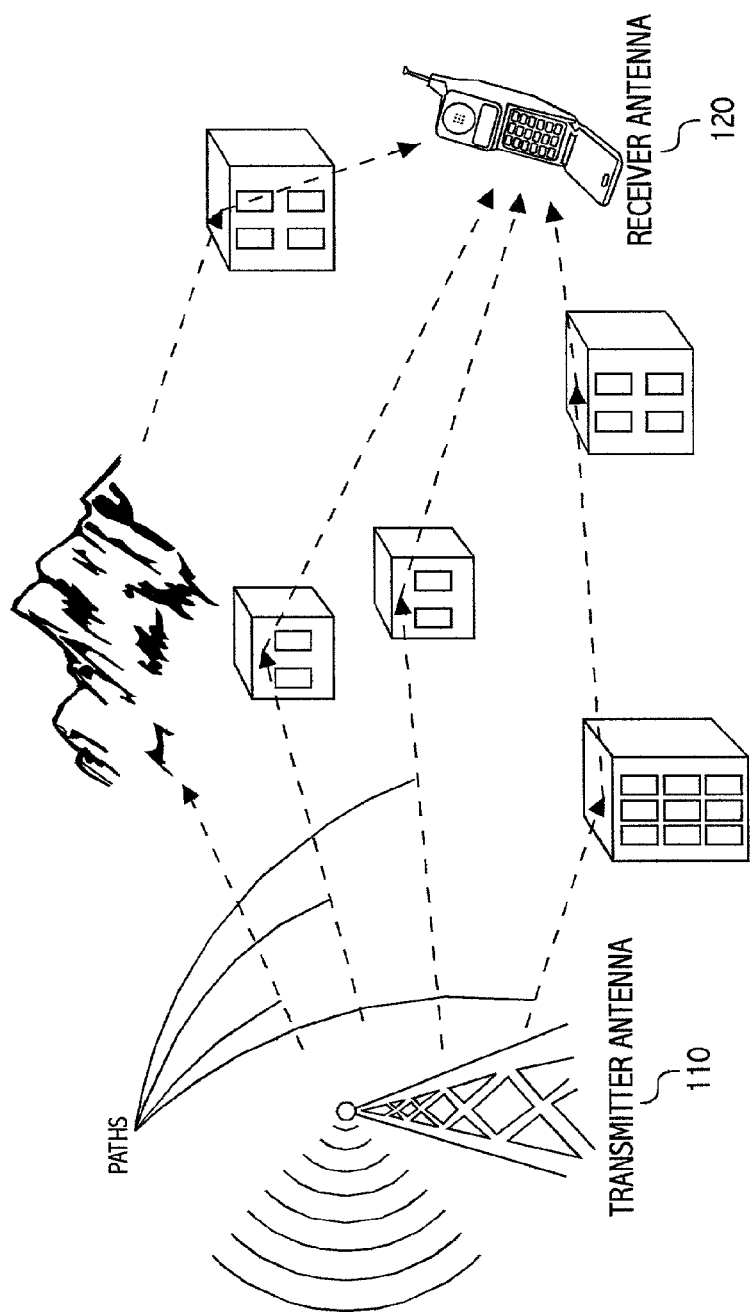
FIG. 1 shows a prior art wireless system that includes multiple paths from a system transmitter to a system receiver.
Figure 2:
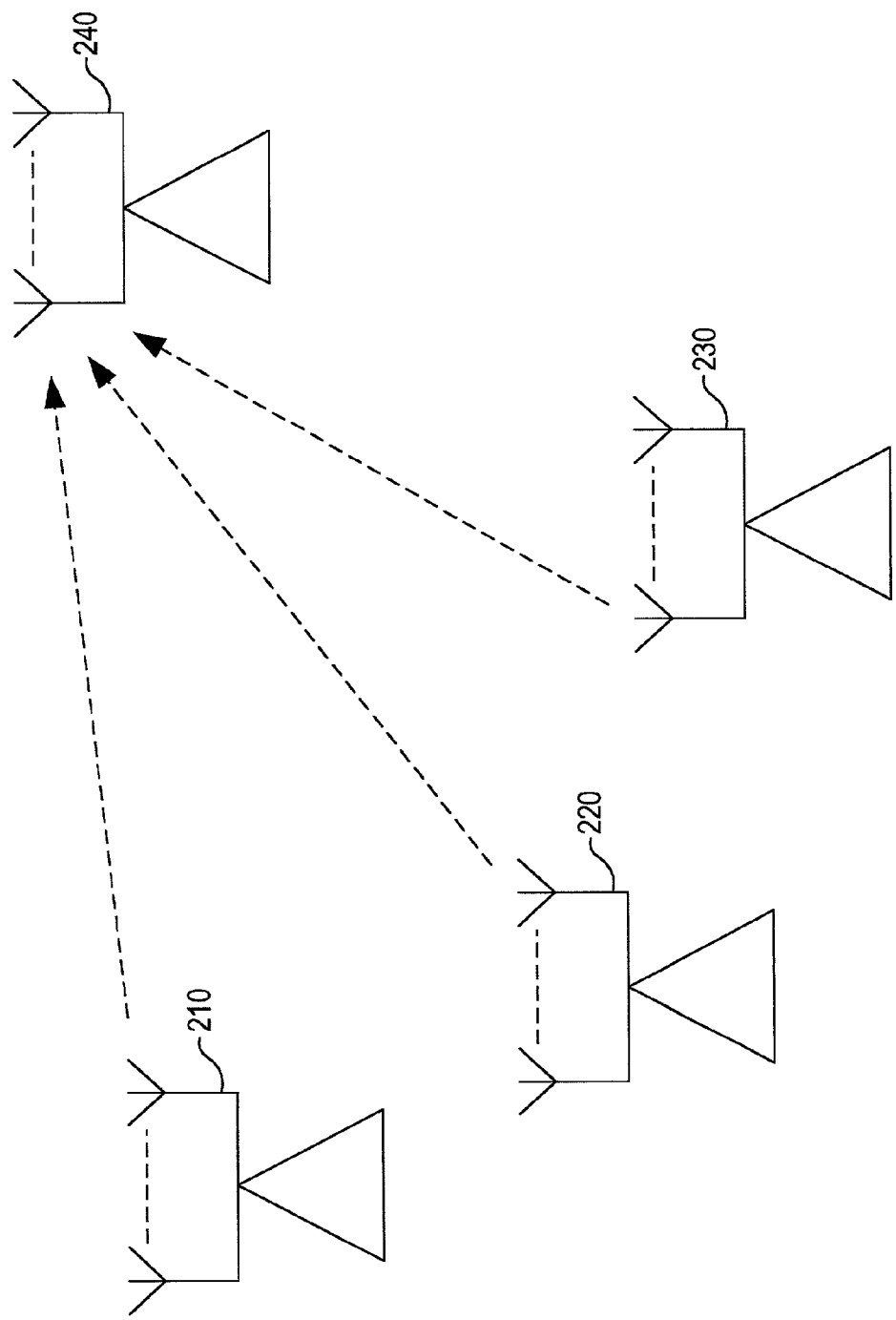
FIG. 2 shows a prior art wireless system that includes spatially separate transmitter antennae and spatially separate receiver antennae.

As shown in the drawings for purposes of illustration, the invention is embodied in a method and system for receiving multiple signals at a multiple channel receiver. The receiver is adaptable to optimally receive information signals that are dominated by either noise or interference. The method and system of the invention are easily implemented with existing multiple channel weighted receivers.

Particular embodiments of the present invention will now be described in detail with reference to the drawing figures. The techniques of the present invention may be implemented in various different types of communication systems. Of particular relevance are cellular wireless communication systems. A base station transmits downlink signals over wireless channels to multiple subscribers. In addition, the subscribers transmit uplink signals over the wireless channels to the base station. Thus, for downlink communication the base station is a transmitter and the subscribers are receivers, while for uplink communication the base station is a receiver and the subscribers are transmitters. Subscribers may be mobile or fixed. Exemplary subscribers include devices such as portable telephones, car phones, and stationary receivers such as a wireless modem at a fixed location.

The base station can be provided with multiple antennas that allow antenna diversity techniques and/or spatial multiplexing techniques. In addition, each subscriber is equipped with multiple antennas that permit further spatial multiplexing and/or antenna diversity. Single Input Multiple Output (SIMO) or Multiple Input Multiple Output (MIMO) configurations are both possible. In either of these configurations, the communications techniques can employ single-carrier or multi-carrier communications techniques. Although the techniques of the present invention apply to point-to-multipoint systems, they are not limited to such systems, but apply to any wireless communication system having at least two devices in wireless communication. Accordingly, for simplicity, the following description will focus on the invention as applied to a single transmitter-receiver pair, even though it is understood that it applies to systems with any number of such pairs.

Point-to-multipoint applications of the invention can include various types of multiple access schemes. Such schemes include, but are not limited to, time division multiple access (TDMA), frequency division multiple access (FDMA), code division multiple access (CDMA), orthogonal frequency division multiple access (OFDMA) and spatial division multiple access (SDMA).

The transmission can be time division duplex (TDD). That is, the downlink transmission can occupy the same channel (same transmission frequency) as the uplink transmission, but occur at different times. Alternatively, the transmission can be frequency division duplex (FDD). That is, the downlink transmission can be at a different frequency than the uplink transmission. FDD allows downlink transmission and uplink transmission to occur simultaneously.

Typically, variations of the wireless channels cause uplink and downlink signals to experience fluctuating levels of attenuation, multi-path fading and other deleterious effects. In addition, interference from other transmitters than the desired transmitter may be present within the same transmission frequency band of the desired transmission signals. The signal impairments experienced during transmission, and due to interference, can change with time. As a result, there are temporal changes in channel communication parameters such as data capacity, spectral efficiency, throughput, and signal quality parameters, e.g., signal-to-interference and noise ratio (SINR), and signal-to-noise ratio (SNR).

Information is transmitted over the wireless channel using one of various possible transmission modes. For the purposes of the present application, a transmission mode is defined to be a particular modulation type and rate, a particular code type and rate, and may also include other controlled aspects of transmission such as the use of antenna diversity or spatial multiplexing. Using a particular transmission mode, data intended for communication over the wireless channel is coded, modulated, and transmitted. Examples of typical coding modes are convolution and block codes, and more particularly, codes known in the art such as Hamming Codes, Cyclic Codes and Reed-Solomon Codes. Examples of typical modulation modes are circular constellations such as BPSK, QPSK, and other m-ary PSK, square constellations such as 4QAM, 16QAM, and other m-ary QAM. Additional popular modulation techniques include GMSK and m-ary FSK. The implementation and use of these various transmission modes in communication systems is well known in the art.

Figure 3:
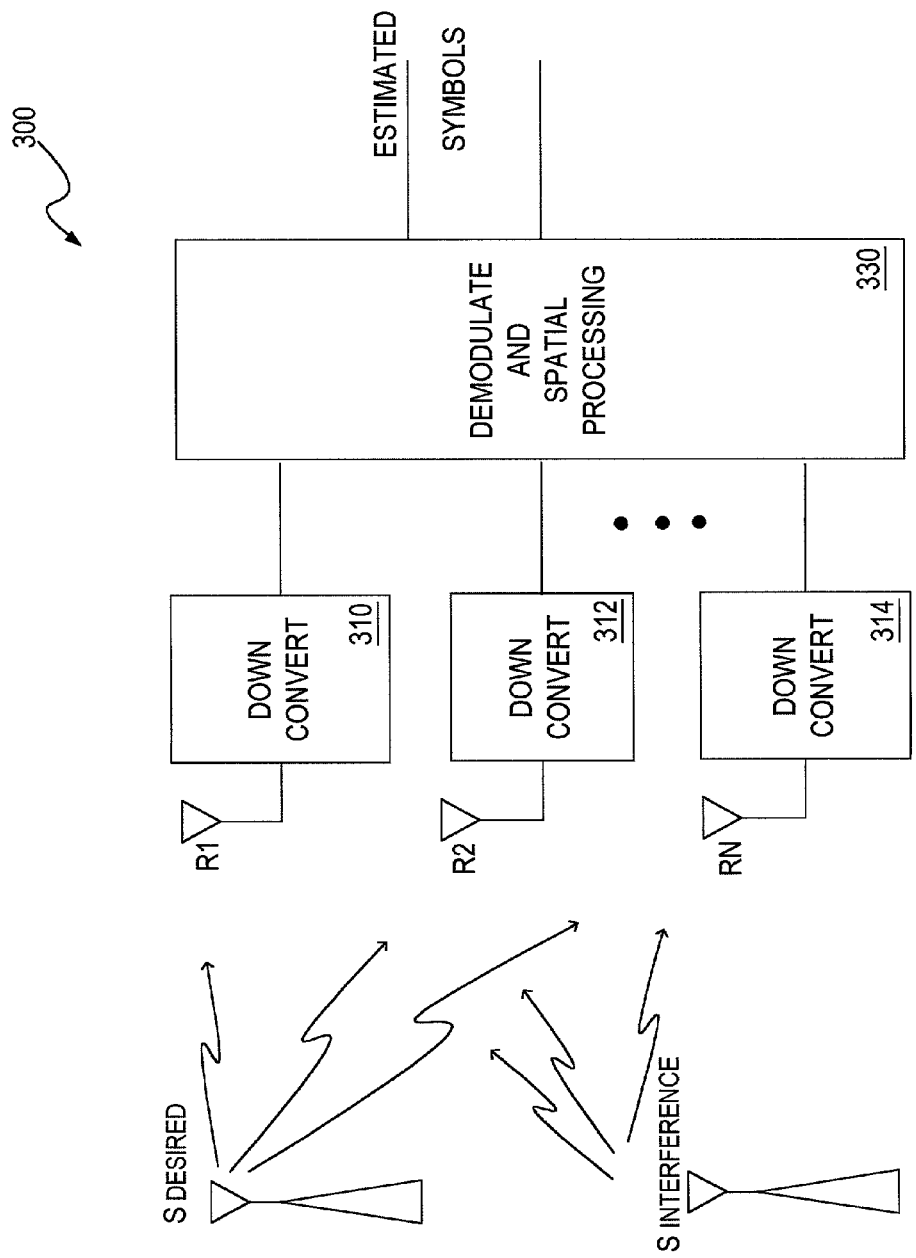
FIG. 3 shows multiple chain receiver that includes an embodiment of the invention.

FIG. 3 shows an embodiment of the invention that includes multiple chain receiver 300. The multiple receiver chains of the receiver 300 allow the invention to be adapted to spatial multiplexing reception, receive diversity or interference cancellation. Each receiver chain corresponds with one or more transmission channels. An information-carrying signal generally travels through each of the transmission channels. As will be described later, a channel matrix H provides a mathematical representation of the transmission channels.

This embodiment includes a plurality of receiver antennas R1, R2 . . . RN. Each receiver antenna R1, R2 . . . RN corresponds with a separate receiver chain. Each receiver chain further includes a frequency down conversion block 310, 312, 314. The frequency down conversion blocks 310, 312, 314 frequency down convert the received information-carrying signals to a base band frequency for demodulation and decoding of the information-carrying signals.

The multiple chain receiver 300 receives both desired signals ($S_{DESIRED}$) and interference signals ($S_{INTERFERENCE}$) and noise. The desired signals include information data. The noise generally includes thermal noise of the transmitter and receiver, background noise, and distortion due to non-linear effects of the transmitter and the receiver. The interference signals are generally produced by other transmitters of a wireless transmission system. Both the noise and the interference signals degrade the performance of the multiple chain receiver 300.

Each receiver chain is connected to a demodulation and spatial processing block 330. The demodulation and spatial processing block 330 demodulates the base band signals, and generates estimates of the transmitted symbols.

The received information signals can be transmitted from a transmitter that includes k spatial separate streams. Generally, such a transmitter applies an encoding mode to each of the k streams to encode the data to be transmitted. Before transmission, the data may be pre-coded and interleaved. Pre-coding and interleaving are well known in the art of communication systems. The transmission rate or throughput of the data varies depending upon the modulation, coding rates and transmission scheme (diversity or spatial multiplexing) used in each of the k streams.

The demodulation and spatial processing block 330 performs receive processing to recover the k encoded streams. The recovered k streams are signal detected, de-interleaved, decoded and de-multiplexed for recovery the data. In the case of antenna diversity processing, it should be understood that k is equal to one and thus there is only a single stream recovered.

The demodulation and spatial processing block 330 generally includes a set of weights that are used to estimate the transmitted symbols based upon the received information signals. This can include, for example, a minimum mean square error (MMSE) receiver. A MMSE receiver applies a set of weights W to the received information signals so that the mean-square error between estimated signals and transmitted signals is minimized.

Let X denote vector of received signals at RN receive antennas. Mathematically, X can be represented as $$X=HS_{DESIRED}+N+I$$

where H represents the channel matrix with elements H[r,t] being the channel response from transmit antenna t to receive antenna r, N represents the noise vector, and I represents the interference vector. The MMSE receiver estimates the desired signals by applying weights $$S_{EST=WX}$$

where the weights W are chosen to minimize an error variance $R_E=Var[S_{DESIRED}-S_{EST}]$. The MMSE weights are a function of the channel matrix and covariance matrix (Rv) of a noise-plus-interference vector V=N+I. The weights are $$W=H^*[HH^*+R_v]^{-1}$$

where * indicates the hermitian-conjugate of the matrix, and $R_v$ is defined as Var[V].

The accuracy of the MMSE signal estimate depends strongly on the estimation accuracy of noise-plus-interference covariance matrix Rv=E[VV*], where E[.] denotes the expectation operator. The noise-plus-inteference vector V can be measured during a time slot in which the information signals are zeroed (nulled), or during a time slot and frequency in which select carriers of a multiple carrier information signals are zeroed (nulled). In a noise-dominated environment, it is possible to estimate $R_v$ very accurately by averaging over several null slots since V can be modeled as random Gaussian vector. In an interference-dominated environment however, a smaller averaging window is typically required since the interference may be changing in time and in frequency. It is important to capture the local spatial structure of the interferer accurately in order to ensure adequate cancellation. Hence, in order to obtain an accurate estimate of transmitted data using a multi-antenna MMSE receiver, it is desirable to first detect whether the transmission environment is noise dominated or interference dominated, and then to select the appropriate covariance matrix in the MMSE weights.

An embodiment of the invention includes detecting whether the received information signals are dominated by either noise or interference. Generally, the detection of whether the received information signals are dominated by noise or interference is possible by considering the level of spatial correlation in the received noise-plus-interference data (during nulled information signals). A relatively large degree of correlation indicates reception of largely interfering signals (an interference environment), whereas a relatively small degree of correlation indicates reception of information signals having a higher level of noise distortion (a noise environment).

Another embodiment of the invention includes selecting a first set of weights as a receiver weighting if the received information signals are dominated by noise, and selecting a second set of weights as the receiver weighting if the received information signals are dominated by interference. The received information signals can be estimated based upon the selected receiver weighting. The first set of weights can be based upon a first covariance matrix, and the second set of weights can be based upon a second covariance matrix. The first covariance matrix can represent received noise covariance, and the second covariance matrix can represent interference covariance.

Figure 4:
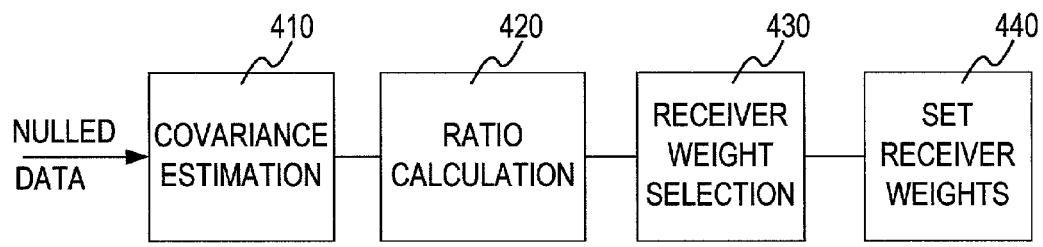
FIG. 4 show an embodiment of the invention.

FIG. 4 show an embodiment of the invention. This embodiment is generally included within the above-described demodulation and spatial processing block 330, and sets receiver weights based upon a level of noise and interference of received information signals. As will be explained later, the levels of noise and interference of the received information signals are determined during a time slot in which the information signals are zeroed (nulled), or during a time slot and frequency in which select carriers of a multiple carrier information signals are zeroed (nulled).

A covariance estimation block 410 receives the nulled data or information signals. The covariance estimation block 410 generates a covariance matrix $R_v$ that provides a representation of the correlation between the received signals of each of the receiver chains.

A ratio calculation block 420 receives the covariance matrix $R_v$ from the covariance estimation block 410, and computes a ratio of its diagonal elements to off-diagonal elements. This ratio can be used to determine the level of correlation between the receiver antennas R1, R2 ... RN. A high level of correlation indicates an environment dominated by interference, while a low level of correlation indicates an environment dominated by noise.

A receiver weight selection block 430 selects receiver weights based upon the ratio generated by the ratio calculation block 420.

A receiver weight set block 440 sets the receiver weighting based upon the selected receiver weights of the receiver weight selection block 430.

Figure 5:
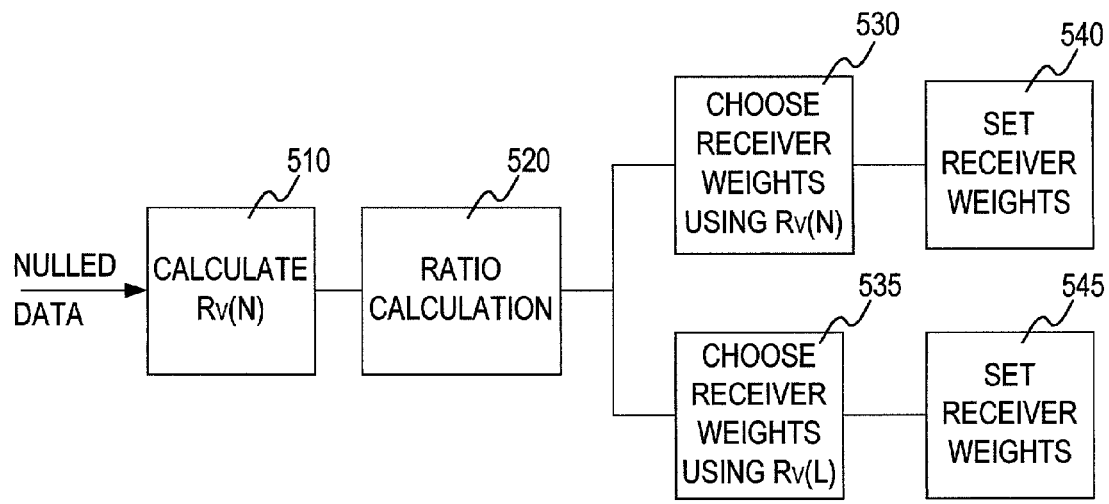
FIG. 5 show another embodiment of the invention.

FIG. 5 show another embodiment of the invention. This embodiment will be described as applied to a multiple carrier transmission system. It is to be understood, however, that the invention is just as applicable to single carrier systems.

A covariance estimator 510 receives nulled multiple carrier signal tones in a time slot n. A signal tone at carrier k of a multiple carrier signal is denoted as v(k,n). The tone covariance estimator 510 calculates a noise-plus-interference covariance matrix $R_v(K,n)$ over K null tones in a time slot n. The covariance matrix $R_v(K,n)$ can be calculated as the outer product of v(k,n) with itself:

$$R_v(K, n) = \frac{1}{K}\sum_k v(k, n)v^H(k, n).$$

The outer product is defined as a multiplication between two vectors. It can be determined a priori or determined at the receiver if the ambient noise and interference environment is constant over multiple (for example N) time slots so that Rv(K,N) can be averaged over time to improve estimation accuracy $$R_v(K, N) = \frac{1}{N}\sum_n R_v(K, n).$$

A ratio calculation block 520 receives the Rv(K,N) matrix and generally generates a ratio of average power in the diagonal terms to average power in the non-diagonal terms. If the environment is noise dominated, Rv(K,N) is approximately a diagonal matrix with diagonal elements that represent the noise-plus-interference power per receive antenna. In this case the ratio of diagonal terms to non-diagonal terms will be large. If the ratio exceeds a predefined threshold, it can be determined that the environment is noise-dominated. In contrast, the ratio will be small in an interference dominated environment since the interfering signal will be correlated across the receive antennas. In this case, the environment can be determined to be interference dominated.

A second covariance matrix can be calculated for the interference dominated signals. The second covariance captures the local spatial structure of the interference. For each null tone k (and time slot n), the second covariance matrix can be calculated by windowing and averaging the outer product of v(.) over L neighboring null tones, $$R_v^{(k)}(L, n) = \frac{1}{L}\sum_l w(l)[v(l+k, n)v^H(l+k, n)],$$

where L<=K and w(.) is a window of length L. Any window type can be chosen such as Hamming, exponential or rectangular window. The window length L is a function of the coherence bandwidth of the interferer's channel. It can be preset in advance to a fixed value, or can be estimated at the receiver and updated adaptively as the interferer characteristics change over time. Furthermore, the accuracy of $Rv^{(k)}(L,n)$ can be improved by averaging over N time slots over which the spatial structure of the interference is determined to be stationary $$R_v^{(k)}(L, N) = \frac{1}{N} \sum_n u(n) R_v^{(k)}(L, n),$$

where u(.) is any window of length N.

Another embodiment includes a filter to efficiently perform the windowing and averaging required in computing $Rv^{(k)}(L,N)$ for all tones. It is particularly advantageous to use a filter when v(k,n) is not available for all tones k since data may be transmitted during these tones. In this case, the filtering operation can also be used to interpolate between null tones to yield an estimate of $Rv^{(k)}(L,N)$ for all tones in the multi-carrier signal. The filtering is performed on the elements of the outer product of v(k,n).

A first receiver weight selection block 530 or a second receiver weight selection block 535 generate the receiver weight selection depending upon the ratio calculated by the ratio calculation block 520.

If the signals received are determined to be interference limited, then an embodiment of the invention selects MMSE receiver weighting as:

$$W_{MMSE} = H^*[HH^* + R_v]^{-1}$$

where H is the previously described channel matrix, and Rv is the noise-plus-interference covariance matrix $Rv = Rv^{(k)}(L,N)$. If the channel is frequency selective then the channel matrix H is dependent upon the index k, and H=H(k).

If the signals received are determined to be noise limited, then an embodiment of the invention selects MMSE receiver weighting as:

$$W_{MMSE} = H^*[HH^* + \text{diag}(R_v)]^{-1}$$

where Rv is the noise-plus-interference covariance matrix Rv=Rv(K,N), and $\text{diag}(R_v)$ is a diagonal matrix in which the diagonal elements are those of Rv. The diagonal elements represent the noise power per receive antenna. Again, H is dependent upon the index k if H is frequency selective.

For a single information signal being received by the multiple chain receiver (diversity) and the signals being determined to be noise limited, in a preferred embodiment the receiver weighting is selected as:

$$W_{MRC} = [H^*H]^{-1}H^*$$

In a further embodiment of the invention, the selected covariance and choice of receiver weights (minimum mean square error (MMSE) or maximum ratio combination (MRC)) is used in computing the signal-to-interference-plus-noise ratio (SINR) at the receiver. The SINR is a function of the channel matrix H and noise-plus-interference matrix Rv. For example, if P information signals are transmitted, the SINR per signal for a MMSE receiver is given by a reciprocal of the diagonal elements of $$R_E = [H^*R_vH+I]^{-1}$$

where I is a P×P identity matrix. If a MRC receiver is selected, then the SINR is given by a reciprocal of $$R_E = \sigma^2[H^*H]^{-1}$$

where $\sigma^2$ is the average noise power obtained by averaging the diagonal elements of Rv. Hence, in order to estimate SINR accurately, it is important to detect whether the ambient environment is interference limited or noise limited, and select a proper choice of Rv to compute the SINR.

The SINR information can be used in to aid in soft-decoding of the received signals. Typically, a soft decoder receives a metric for each transmitted bit which represents the probability whether it is a one or a zero. This metric can be further multiplied by the SINR corresponding to that bit. The SINR provides additional reliability information to the decoder so that more weight can be given to bits with high SINR and less weight to bits with lower SINR. The product of the metric and SINR is input to a soft decoder such as a Viterbi decoder. SINR weighting results in improved decoder performance.

The SINR information can be additionally used for other purposes such as statistic gathering, error-detection in the system, and link adaptation. Link adaptation allows the receiver to signal the proper transmission mode (coding, QAM modulation, spatial multiplexing or diversity) to the transmitter based on the received SINR. The link can be adapted over time as the transmission channel or interference environment changes. Properly adapting the link based on channel and interference characteristics (as reflected by the SINR) can yield important gains in system capacity.

Orthogonal Frequency Division Multiplexing (OFDM) Modulation

Frequency division multiplexing systems include dividing the available frequency bandwidth into multiple data carriers. OFDM systems include multiple carriers (or tones) that divide transmitted data across the available frequency spectrum. In OFDM systems, each tone is considered to be orthogonal (independent or unrelated) to the adjacent tones. OFDM systems use bursts of data, each burst of a duration of time that is much greater than the delay spread to minimize the effect of ISI caused by delay spread. Data is transmitted in bursts, and each burst consists of a cyclic prefix followed by data symbols, and/or data symbols followed by a cyclic suffix.

Figure 6:
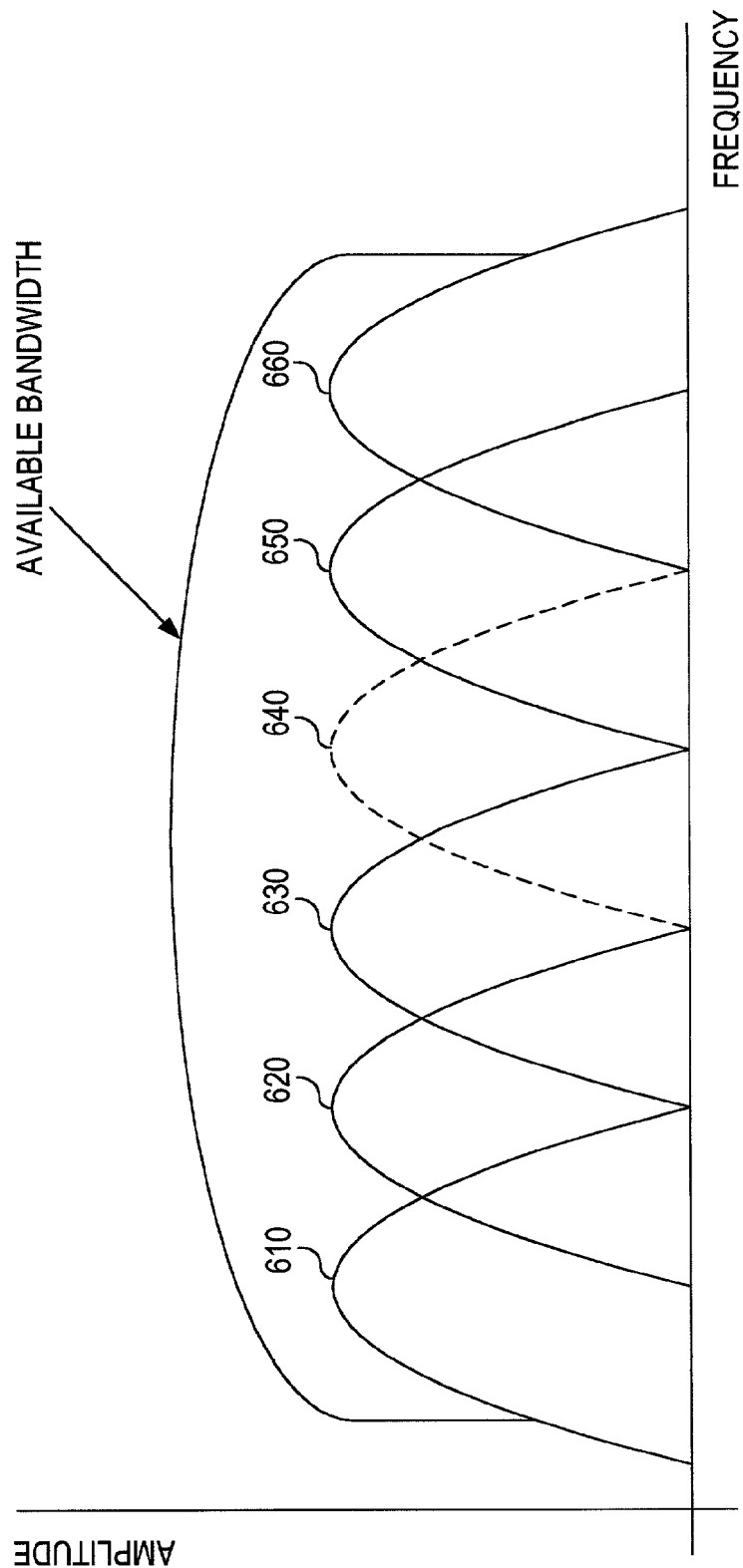
FIG. 6 shows a frequency spectrum of orthogonal frequency division multiplexing (OFDM) sub-carrier signals.

FIG. 6 shows a frequency spectrum of OFDM sub-carrier signals 610, 620, 630, 640, 650, 660. Each sub-carrier 610, 620, 630, 640, 650, 660 is modulated by a separate symbol.

An example OFDM signal occupying 6 MHz is made up of 1024 individual carriers (or tones), each carrying a single QAM symbol per burst. A cyclic prefix or cyclic suffix is used to absorb transients from previous bursts caused by multipath signals. Additionally, the cyclic prefix or cyclic suffix causes the symbol stream to look periodic. Additional symbols (for example 100) are transmitted for the cyclic prefix or cyclic suffix. For each symbol period a total of 1124 symbols are transmitted, by only 1024 unique QAM symbols per burst. In general, by the time the cyclic prefix is over, the resulting waveform created by the combining multipath signals is not a function of any samples from the previous burst. Therefore, no ISI occurs. The cyclic prefix must be greater than the delay spread of the multipath signals.

Generation of the Covariance Matrices

The frequency spectrum of OFDM sub-carrier signals of FIG. 6 can include at least one of the sub-carriers, for example, sub-carrier 640 that is nulled. Calibration of the noise and interference can be made at the frequency and time slot of the nulled sub-carrier 640. Without a sub-carrier being transmitted at the calibrated time and frequency slot of the zeroed sub-carrier, the received signal consists primarily of the noise and interference.

Calibration of the signal error by zeroing a sub-carrier of a multiple carrier system is substantially better than a signal error estimation or calibration obtained by zeroing a single carrier of a single carrier system. Zeroing the carrier of a single carrier system eliminates all signal energy during the time slot occupied by the zeroed carrier. As a result, the components within the receiver chains will not distort during the zeroed carrier. Therefore, the estimation of the noise (including distortion) during the zeroed carrier single carrier is an inaccurate estimation of the noise (including distortion) when receiving a non-zeroed carrier. However, estimation of the signal error using a zeroed sub-carrier within a multiple carrier signal provides a much more accurate estimate of the signal error because during the transmission of the zeroed tone, the majority of sub-carriers are at full power. Therefore, the components within the receiver chains include distortion due to signal energy passing through the components.

Figure 7:
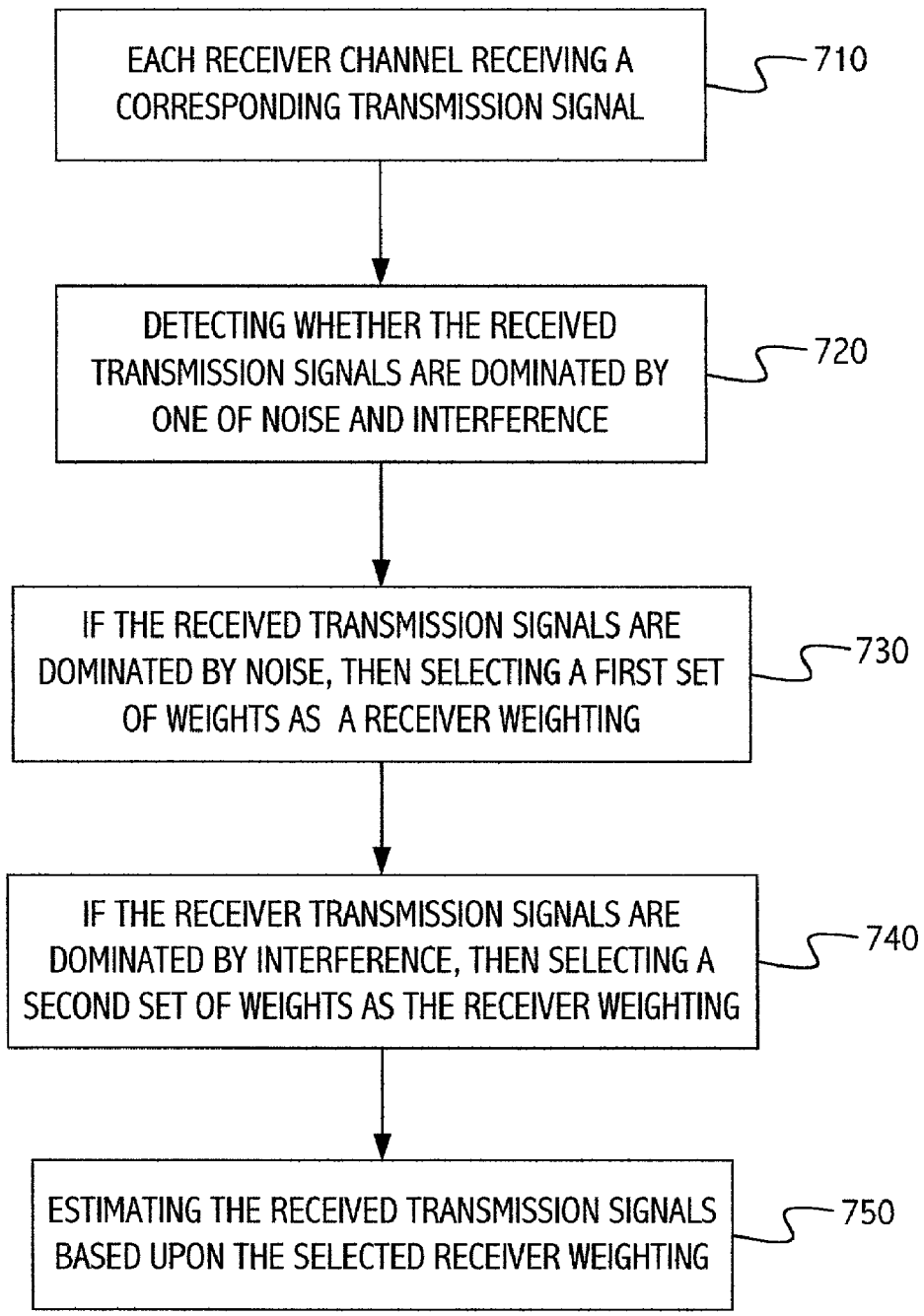
FIG. 7 shows a flow chart of steps or acts included within an embodiment of the invention.

FIG. 7 shows a flow chart of steps or acts included within an embodiment of the invention. This embodiment includes a method of receiving a plurality of transmission signals at a receiver. The transmission signals each traveling through a corresponding transmission channel. The receiver includes a plurality of receiver channels, a receiver channel corresponding to each transmission channel.

A first act 710 includes each receiver channel receiving a corresponding transmission signal.

A second act 720 includes detecting whether the received transmission signals are dominated by noise or interference. Detecting whether the received transmission signals are dominated by noise or interference can include determining a level of spatial correlation between the received transmission signals. The detection can be determined during at least one time slot of nulled transmission signals, or during at least one time slot of a nulled carrier of multiple carrier transmission signals.

The detection can be repeated periodically, or the detection can be repeated as determined by interference monitoring knowledge.

A third act 730 includes selecting a first set of weights as a receiver weighting if the received transmission signals are dominated by noise. The first set of weights can be based upon a first covariance matrix, wherein the first covariance matrix represents a received noise and interference covariance.

The first covariance matrix can be calculated by averaging an outer product of received multiple carrier signals at null carriers of at least one transmission time slot.

The first set of weights can be calculated consistent with an maximum ratio combination (MRC) weighting if only one information signal is transmitted. The first set of weights can be calculated consistent with a minimum mean squared estimate (MMSE) weighting if more than one information signal is transmitted.

A fourth act 740 includes selecting a second set of weights as the receiver weighting if the received transmission signals are dominated by interference. The second set of weights can be based upon a second covariance matrix, wherein the second covariance matrix represents an interference covariance.

The second covariance matrix can be calculated by windowing and averaging an outer product of neighboring null tones of a received multiple carrier signal of at least one time slot.

The second set of weights can be calculated consistent with a minimum mean squared estimate (MMSE) weighting if one or more information signal are transmitted.

Detecting whether the received transmission signals are dominated by noise or interference can include calculating a ratio of mean-squares values of diagonal elements of the first covariance matrix to mean-squares values of off-diagonal elements of the first covariance matrix.

A fifth act includes estimating the received transmission signals based upon the selected receiver weighting.

Although specific embodiments of the invention have been described and illustrated, the invention is not to be limited to the specific forms or arrangements of parts so described and illustrated. The invention is limited only by the claims.

What is claimed:

1. A method of receiving a plurality of transmission signals at a receiver, the transmission signals each traveling through a corresponding transmission channel, the receiver comprising a plurality of receiver channels, a receiver channel corresponding to each transmission channel, the method comprising:

each receiver channel receiving a corresponding transmission signal;

detecting whether the received transmission signals are dominated by one of noise and interference;

if the received transmission signals are dominated by noise, then selecting a first set of weights as a receiver weighting;

if the received transmission signals are dominated by interference, then selecting a second set of weights as the receiver weighting; and estimating the received transmission signals based upon the selected receiver weighting.

2. The method of receiving a plurality of transmission signals at a receiver of claim 1, wherein detecting whether the received transmission signals are dominated by one of noise and interference comprises determining a level of spatial correlation between the received transmission signals.

3. The method of receiving a plurality of transmission signals at a receiver of claim 1, wherein detecting whether the received transmission signals are dominated by one of noise and interference is determined during at least one time slot of nulled transmission signals.

4. The method of receiving a plurality of transmission signals at a receiver of claim 1, wherein the transmission signals are multiple carrier signals, and wherein detecting whether the received transmission signals are dominated by one of noise and interference is determined during at least one time slot of a nulled carrier of the transmission signals.

5. The method of receiving a plurality of transmission signals at a receiver of claim 1, further comprising generating a first covariance matrix representing received noise and interference covariance, and generating a second covariance matrix representing interference covariance.

6. The method of receiving a plurality of transmission signals at a receiver of claim 5, wherein the first set of weights are based upon the first covariance matrix, and the second set of weights are based upon the second covariance matrix.

7. The method of receiving a plurality of transmission signals at a receiver of claim 1, wherein detecting whether the received transmission signals are dominated by one of noise and interference is repeated periodically.

8. The method of receiving a plurality of transmission signals at a receiver of claim 1, wherein detecting whether the received transmission signals are dominated by one of noise and interference is repeated as determined by interference monitoring knowledge.

9. The method of receiving a plurality of transmission signals at a receiver of claim 1, wherein values of the first set of weights are dependent upon a ratio of an interference level and a noise level.

10. The method of receiving a plurality of transmission signals at a receiver of claim 1, wherein values of the second set of weights are dependent upon a ratio of an interference level and a noise level.

11. The method of receiving a plurality of transmission signals at a receiver of claim 1, wherein the selected set of weights are additionally used for soft decoding of the received transmission signals.

12. The method of receiving a plurality of transmission signals at a receiver of claim 1, wherein the selected set of weights are additionally used for transmission mode selection.

13. The method of receiving a plurality of transmission signals at a receiver of claim 5, wherein detecting whether the received transmission signals are dominated by one of noise and interference comprises:
calculating a ratio of mean-squares values of diagonal elements of the first covariance matrix to mean-squares values of off-diagonal elements of the first covariance matrix.

14. The method of receiving a plurality of transmission signals at a receiver of claim 5, wherein first covariance matrix is calculated by averaging an outer product of received multiple carrier signals at null carriers of at least one transmission time slot.

15. The method of receiving a plurality of transmission signals at a receiver of claim 5, wherein second covariance matrix is calculated by windowing and averaging an outer product of neighboring null tones of a received multiple carrier signal of at least one time slot.

16. The method of receiving a plurality of transmission signals at a receiver of claim 1, wherein the first set of weights are calculated consistent with a maximum ratio combination (MRC) weighting if only one information signal is transmitted.

17. The method of receiving a plurality of transmission signals at a receiver of claim 1, wherein the first set of weights are calculated consistent with a minimum mean squared estimate (MMSE) weighting if more than one information signal is transmitted.

18. The method of receiving a plurality of transmission signals at a receiver of claim 1, wherein the second set of weights are calculated consistent with an minimum mean squared estimate (MMSE) weighting if at least one information signal is transmitted.

19. A multiple channel receiver for receiving a plurality of transmission signals, the transmission signals each traveling through a corresponding transmission channel, a receiver channel corresponding to each transmission channel, the receiver comprising:
means for detecting whether the received transmission signals are dominated by one of noise and interference;
means for selecting a first set of weights as a receiver weighting if the received transmission signals are dominated by noise;
means for selecting a second set of weights as the receiver weighting if the received transmission signals are dominated by interference;
means for estimating the received transmission signals based upon the selected receiver weighting.

20. The multiple channel receiver of claim 19, wherein detecting whether the received transmission signals are dominated by one of noise and interference comprises determining a level of spatial correlation between the received transmission signals.

21. The multiple channel receiver of claim 19, wherein detecting whether the received transmission signals are dominated by one of noise and interference is determined during at least one time slot of nulled transmission signals.

22. The multiple channel receiver of claim 19, wherein the transmission signals are multiple carrier signals, and wherein detecting whether the received transmission signals are dominated by one of noise and interference is determined during at least one time slot of a nulled carrier of the transmission signals.

23. The multiple channel receiver of claim 19, further comprising means generating a first covariance matrix representing received noise and interference covariance, and generating a second covariance matrix representing interference covariance.

24. The multiple channel receiver of claim 23, wherein the first set of weights are based upon the first covariance matrix, and the second set of weights are based upon the second covariance matrix.

25. The multiple channel receiver of claim 19, wherein detecting whether the received transmission signals are dominated by one of noise and interference is repeated periodically.

26. The multiple channel receiver of claim 19, wherein detecting whether the received transmission signals are dominated by one of noise and interference is repeated as determined by interference monitoring knowledge.

* * * * *